US012617525B2

(12) United States Patent
Ausserlechner et al.

(10) Patent No.: US 12,617,525 B2
(45) Date of Patent: May 5, 2026

(54) DRIVE UNIT FOR A ROTARY-WING AIRCRAFT, AND ROTARY-WING AIRCRAFT

(71) Applicant: FLYNOW AVIATION GMBH, Salzburg (AT)

(72) Inventors: Peter Ausserlechner, Salzburg (AT); Jürgen Greil, Salzburg (AT); Markus Kampitsch, Salzburg (AT); Jens Steingräber, Salzburg (AT)

(73) Assignee: FLYNOW AVIATION GMBH, Salzburg (AT)

( * ) Notice: Subject to any disclaimer, the term of this patent is extended or adjusted under 35 U.S.C. 154(b) by 480 days.

(21) Appl. No.: 18/035,056

(22) PCT Filed: Oct. 28, 2021

(86) PCT No.: PCT/EP2021/080044
§ 371 (c)(1),
(2) Date: May 2, 2023

(87) PCT Pub. No.: WO2022/090423

PCT Pub. Date: May 5, 2022

(65) Prior Publication Data

US 2023/0399098 A1      Dec. 14, 2023

(30) Foreign Application Priority Data

Nov. 2, 2020      (DE) ..................... 10 2020 128 799.2

(51) Int. Cl.
*B64C 27/10*          (2023.01)
*B64D 27/34*          (2024.01)
(Continued)

(52) U.S. Cl.
CPC .............. *B64C 27/10* (2013.01); *B64D 27/34* (2024.01); *B64D 35/021* (2024.01); *B64U 30/24* (2023.01); *B64U 50/19* (2023.01)

(58) Field of Classification Search
CPC ......... B64C 27/10; B64C 27/52; B64C 27/43; B64C 11/02; B64C 11/04; B64C 11/10; B64C 11/30
See application file for complete search history.

(56) References Cited

U.S. PATENT DOCUMENTS

| | | | |
|---|---|---|---|
| 1,682,893 A | 9/1928 | Cierva | |
| 6,182,923 B1 * | 2/2001 | Weinhart | ............... B64D 35/04 |
| | | | 244/17.11 |

(Continued)

FOREIGN PATENT DOCUMENTS

| | | | | |
|---|---|---|---|---|
| CN | 107352026 A | * | 11/2017 | ............. B64U 10/10 |
| CN | 108791857 A | * | 11/2018 | ............. B64C 27/10 |

(Continued)

OTHER PUBLICATIONS

International Search Report issued in PCT/EP2021/080044, with translation, dated Feb. 23, 2022, 4 pgs.

*Primary Examiner* — Benjamin P Lee
(74) *Attorney, Agent, or Firm* — HAYES SOLOWAY P.C.

(57)          ABSTRACT

A drive unit for a rotary-wing aircraft has a first and second propeller, which rotates in the opposite direction to, and are axially spaced apart from, the first propeller. A first and second drive shaft are arranged coaxially with the first drive shaft, for the propellers, wherein the propellers are each rigid and mounted to be tiltable relative to the axis of rotation of their drive shafts. The tilt axis of each propeller extends in a plane perpendicular to the axis of rotation of the drive shafts and is oriented at an angle different from 90° relative to the longitudinal axis of the propeller. An electric drive module has at least two rotors which are coupled to one of the drive shafts, wherein the ratio of the diameter of the propellers to the axial distance between the propellers is between 4:1 and 12:1.

14 Claims, 5 Drawing Sheets

(51) Int. Cl.
    *B64D 35/021*     (2024.01)
    *B64U 30/24*     (2023.01)
    *B64U 50/19*     (2023.01)

(56)           References Cited

U.S. PATENT DOCUMENTS

| | | | | |
|---|---|---|---|---|
| 7,204,453 | B2 * | 4/2007 | Muren | A63H 27/12 |
| | | | | 244/17.11 |
| 8,096,497 | B2 * | 1/2012 | Luo | A63H 27/12 |
| | | | | 244/17.23 |
| 10,150,567 | B2 | 12/2018 | Lauder et al. | |
| 10,486,794 | B2 * | 11/2019 | Kiesewetter | B64C 27/43 |
| 10,543,912 | B2 * | 1/2020 | Welsh | B64C 27/72 |
| 11,560,224 | B2 * | 1/2023 | Cox | B64C 27/605 |
| 2002/0109044 | A1 * | 8/2002 | Rock | B64C 27/10 |
| | | | | 244/17.23 |
| 2004/0245376 | A1 * | 12/2004 | Muren | A63H 27/12 |
| | | | | 244/17.11 |
| 2017/0297677 | A1 * | 10/2017 | Kiesewetter | B64C 27/43 |
| 2018/0044029 | A1 | 2/2018 | Koegler et al. | |
| 2020/0198780 | A1 | 6/2020 | Huang | |
| 2021/0214077 | A1 * | 7/2021 | Cox | B64C 27/80 |

| | | | | |
|---|---|---|---|---|
| 2021/0323661 | A1 * | 10/2021 | Ge | B64C 27/10 |
| 2022/0017217 | A1 * | 1/2022 | Cox | B64C 27/10 |
| 2022/0153407 | A1 * | 5/2022 | Howes | B64C 27/43 |
| 2025/0162710 | A1 * | 5/2025 | Frissora | B64U 30/24 |

FOREIGN PATENT DOCUMENTS

| | | | | | |
|---|---|---|---|---|---|
| CN | 109956028 | A | * | 7/2019 | B64C 27/10 |
| CN | 109533310 | B | * | 5/2022 | B64C 13/00 |
| DE | 10125077 | | | 11/2002 | B64C 27/08 |
| DE | 102004004480 | | | 6/2006 | H02K 7/14 |
| DE | 102016206551 | | | 10/2017 | B64C 27/10 |
| DE | 102016206551 | A1 | * | 10/2017 | B64C 27/26 |
| EP | 1572534 | | | 9/2006 | B64C 27/473 |
| FR | 3074778 | | | 6/2019 | B64C 27/43 |
| RU | 2715113 | | | 2/2020 | B64C 27/10 |
| WO | WO99/63218 | | | 12/1999 | F03D 1/06 |
| WO | WO-02062661 | A1 | * | 8/2002 | B64C 27/10 |
| WO | WO2004/103814 | | | 12/2004 | B64C 27/473 |
| WO | WO2017/103867 | | | 6/2017 | B64C 39/02 |
| WO | WO-2020000857 | A1 | * | 1/2020 | B64C 27/12 |
| WO | WO-2024205971 | A1 | * | 10/2024 | B64C 11/50 |
| WO | WO-2024209496 | A1 | * | 10/2024 | B64C 39/026 |

* cited by examiner

DRIVE UNIT FOR A ROTARY-WING AIRCRAFT, AND ROTARY-WING AIRCRAFT

The invention relates to a drive unit for a rotary-wing aircraft and to a rotary-wing aircraft having a drive unit.

Rotary-wing aircraft, often referred to as helicopters, typically comprise at least one propeller or rotor that is arranged on a top surface of the rotary-wing aircraft and generates lift when rotated.

When a helicopter is not hovering but flying forward, the flow velocity resulting from the rotation of the rotor is superimposed at the rotor or propeller blades on the blade-tip velocity resulting from the forward movement of the helicopter. When observing a revolution of a rotor blade in forward flight, a sector can be seen in which the rotor blade moves backward. There, the relative blade-tip velocity of the rotor blade decreases by the oppositely directed flight velocity of the helicopter, so that in a position of the rotor blade of 90° relative to the direction of flight, the effective flow velocity is at the minimum. In the sector in which the rotor blade moves forward, the two velocities add up, so that in a position of the rotor blade of 90° relative to the direction of flight, the flow velocity is at the maximum.

Thus, when observing a rotor having two rotor blades, in the condition in which the two rotor blades are exactly perpendicular to the direction of flight, a noticeable difference arises between the high lift that is generated by the forward-running rotor blade and the low lift that is generated by the rearward-running rotor blade.

This effect is most pronounced in forward flight, since this is where the highest flight velocities are reached. However, the same effects are produced during sideways or backward flight, albeit at a lower level due to the lower flight velocities.

In a rotor having rotor blades the angle of attack of which can be varied, this effect can be compensated by a cyclic change of the angle of attack. When the rotor blade moves forward, the angle of attack is decreased in order to counteract the increase in lift caused by the higher blade-tip velocity, and when the rotor blade moves backward, it is increased in order to compensate for the lower blade-tip velocity.

However, the systems by which the angle of attack of the rotor blades can be changed cyclically (usually by means of a swashplate) are comparatively elaborate. Also, the rotors are quite complex.

It is therefore an object of the invention to provide a drive unit for a rotary-wing aircraft which is as simple and cost-effective as possible.

This object is achieved according to the invention by a drive unit for a rotary-wing aircraft, including a first propeller and a second propeller, which rotates in the opposite direction to, and is axially spaced apart from, the first propeller, including a first drive shaft and a second drive shaft, arranged coaxially with the first drive shaft, for the propellers, wherein the two propellers are each rigid and are mounted so as to be tiltable relative to the axis of rotation of their drive shafts, wherein the tilt axis of each propeller extends in a plane perpendicular to the axis of rotation of the drive shafts and is oriented at an angle different from 90 degrees relative to the longitudinal axis of the propeller, and including an electric drive module having at least two rotors which are coupled to a respective one of the drive shafts, wherein the ratio of the diameter of the propellers to the axial distance between the propellers is between 4:1 and 12:1. This drive unit allows a variety of advantages to be combined.

Due to its orientation, the tilt axis causes the propeller, when pivoting about the tilt axis, to perform a rotation about its longitudinal axis. This rotation leads to a change in the angle of attack, namely in opposite directions in the case of a propeller having two propeller blades arranged oppositely to each other. In this way, the angle of attack of a forward-running propeller blade can be decreased while at the same time the angle of attack of a backward-running propeller blade is increased. This allows the use of rigid propellers, that is, propellers in which the propeller blades are connected to a hub rigidly and thus at an invariable angle of attack. This results in a simple structure and low costs, while it is nonetheless possible to cyclically change the angle of attack of the propeller blades during rotation. This is done passively, i.e. solely under the effect of the lift generated and any imbalance of lift. The tilt axis is oriented in such a way here that an increase in lift (for example, due to an increase in the blade-tip velocity during forward flight) tilts the propeller such that the angle of attack is reduced in the sector with higher lift. This automatically results in an increase in the angle of attack in that sector of the propeller in which the relative blade-tip velocity is lower.

By being able to tilt about the tilt axis, the propellers can also react automatically, that is, passively, and in a self-regulating manner to other disturbances of a uniform lift distribution, for example in the event of gusts of wind. This results in a more stable flight attitude, and high bending moments in the propeller and in the bearing points are avoided.

Due to the ratio of the diameter of the propellers to the axial distance between the propellers being between 4:1 and 12:1, it is ensured that the propellers cannot touch each other when the forward velocity is below the cruising speed of approx. 150 km/h which is the maximum speed for this purpose. Moreover, the aforementioned ratio is advantageous because, with such a ratio, the maximum bending moments occurring on the drive shafts are low. The shorter the axial distance between the propellers, the lower the bending moment and the bearing loads resulting therefrom, in particular on the drive shaft for the upper propeller.

Furthermore, an advantageous aerodynamic interaction takes place between two fixed pitch propellers in this range of ratio of the axial distance to the rotor diameter.

The drive shaft associated with the lower propeller is preferably in the form of a hollow shaft, and the drive shaft associated with the upper propeller is rotatably guided in the hollow shaft, so that a high degree of flexural rigidity is obtained for the drive shaft of the upper propeller.

Since the propellers are of a rigid configuration, i.e. in the form of so-called fixed pitch propellers, the amount of lift generated is controlled by the speed of rotation.

The upper propeller may have a larger diameter compared to the lower propeller. As a result, turbulences and flow irregularities which are generated by the rotating blade tips of the upper propeller and flow off downward toward the bottom propeller plane due to the generation of lift cannot interact aerodynamically with the propellers of the lower plane, but can pass the lower propeller on a circular path enlarged in radius compared to the lower propeller. In particular, a propeller with a higher or lower aerodynamic load due to its arrangement can be adapted to the respective other propeller in terms of its drive torque at particular speeds by an appropriate design of the diameter, so that a torque equilibrium is achieved between the two propellers with the difference in speed being as small as possible. This allows acoustic effects such as beats to be avoided.

The tilt axis extends relative to the longitudinal axis of the propeller preferably at an angle of +30° to +50° or −30° to −50°. With such an angle, the unequal distribution of lift can be compensated particularly well.

To enable the propellers to tilt, at least one pin extends along the tilt axis and connects a hub of the propeller to the drive shaft in an articulated manner. A pin allows an articulated connection to be implemented particularly easily.

According to one embodiment, an intermediate piece may be provided which is arranged coaxially with the hub of the propeller and is detachably connected to the hub and on which the pin is mounted and which is adapted to be connected to the hub in various angular positions. In this way, the angle of the tilt axis can be adjusted by connecting the intermediate piece to the hub in an appropriate position. The angle can also be changed subsequently in that the hub is detached from the intermediate piece and reinserted in a new angular position.

For example, corresponding toothings are provided on the hub and on the intermediate piece, the toothings connecting the intermediate piece to the hub in a form-locking manner.

According to an alternative embodiment, the propeller may have a connecting surface in which a multitude of holes is provided, and an intermediate piece on which the pin is mounted may have a contact surface corresponding to the connecting surface, wherein the contact surface has a hole pattern provided therein which is configured such that the propeller can be connected to the intermediate piece in various angular positions. The holes in the connecting surface and, respectively, in the contact surface are used in particular as bolt holes to attach the propeller to the intermediate piece. For attaching the propeller, at least one of the holes of the hole pattern in the contact surface of the intermediate piece has to be in alignment with one of the holes in the connecting surface. Preferably, however, the hole pattern is formed in such a way that in each intended angular position, a plurality of holes of the hole pattern are aligned with holes in the connecting surface in order to be able to implement a plurality of threaded connections.

The connecting surface may be formed in a component connected to the propeller or integrally within the propeller.

Preferably, at least two hole circles of different diameters are provided in the connecting surface, with the holes of the first hole circle being arranged at an angular offset from the holes of the second hole circle. In this way, a larger number of different angular positions can be realized than with only one hole circle, without impairing the stability of the component because of too narrow a distance between the holes.

The hole pattern in the intermediate piece correspondingly has at least one hole that can be brought into alignment with the holes of the first hole circle, and at least one second hole that can be brought into alignment with the holes of the second hole circle. In other words, a radial distance of the holes in the contact surface of the intermediate piece from an axis of rotation corresponds to the radius of the hole circles, with at least two holes having different radial distances from the axis of rotation of the propeller being provided in the contact surface.

The electric drive module includes, in particular, two electric motors, which are accommodated coaxially with each other in a shared housing. As a result, the drive unit can be particularly compact.

The electric motors are preferably in the form of internal rotor motors. The configuration of the electric motors as internal rotor motors ensures that the stator coils to which current is applied are accessible for electrical lines from the outside of the motor housing and any waste heat produced can be easily dissipated.

According to one embodiment, the drive unit comprises a bearing unit by means of which the drive unit can be connected to a cabin of a rotary-wing aircraft so as to be pivotable relative to a pivot bearing point. The pivotable mounting of the drive unit allows the orientation of the propellers to be changed in a desired manner so that the flight attitude, flight direction and flight velocity can be open-loop or closed-loop controlled without any elaborate systems. In particular, adjusting mechanisms for actively changing the angle of attack of the propeller blades in relation to the propeller hub may be dispensed with, since the rotary-wing aircraft can be controlled solely by a change in speed and by tilting the drive unit.

The bearing unit includes, for example, a cone-shaped connecting element, by means of which the drive unit can be fitted to a carrier of a rotary-wing aircraft. The connecting element can be used to reliably introduce the loads that occur into a carrier structure of the rotary-wing aircraft, while the weight is kept low.

In order to realize a so-called tilt head control, an adjusting device may act between the bearing unit and the unit formed of the drive module and the drive shafts in order to allow the orientation of the drive shafts to be adjusted relative to the bearing unit. The drive unit can therefore generate the lift and serve to control the rotary-wing aircraft at the same time.

For example, one end of the adjusting device engages the drive module, in particular the housing of the drive module, so that the forces that occur can be directly absorbed and transmitted.

The adjusting device includes, for example, at least one actuator that is adjustable in length. For example, the actuator comprises a servomotor.

Preferably, two actuators are provided, with both actuators being arranged at an angle to each other in the circumferential direction with respect to the bearing unit in order to be able to deflect the drive unit in any direction in a defined manner. The angular distance between the two actuators is preferably 90° to ensure maximum efficiency.

The two actuators are mechanically independent of each other, so that an inclination of the drive unit can be adjusted particularly flexibly, so that a rotary-wing aircraft having a corresponding drive unit can be maneuvered especially flexibly. In particular, good maneuverability in confined spaces can be achieved in this way, so that the drive unit is particularly suitable for rotary-wing aircraft that are employed in urban environments where the space available is frequently limited.

The unit formed by the drive module and the drive shafts may be connected to the bearing unit by means of a universal joint. This ensures that the unit formed by the drive module and the drive shafts can be pivoted in any direction. At the same time, axial forces can be absorbed.

According to one embodiment, a bearing for the inner one of the two drive shafts is arranged on the side of the universal joint facing away from the propellers. In this way, a larger bearing distance and thus a stable mounting of the upper propeller is achieved.

Furthermore, a control unit may be provided for controlling the speed of the propellers, the control unit being adapted to control the speeds of the propellers such that a torque equality exists. This obviates the need for a tail rotor.

The above-mentioned object is further achieved according to the invention by a rotary-wing aircraft including a drive unit which is configured as described above, the rotary-wing aircraft including a cabin which constitutes a passenger compartment and/or a payload compartment. This makes the rotary-wing aircraft suitable for transporting persons or goods.

The maximum take-off weight of the rotary-wing aircraft is preferably between 150 kg and 600 kg. Rotary-wing aircraft of this type are suitable, for example, for transporting single persons or several parcels. Thus, they are particularly suitable for use in urban environments. The rotary-wing aircraft may thus be referred to as a drone that is controlled from the outside.

The rotary-wing aircraft may comprise a carrier for the drive unit, wherein the adjusting device is fixed to the bearing unit and is configured such that it can pivot the unit formed of the drive module and the drive shafts in relation to the carrier.

The drive unit is preferably arranged above the cabin, in particular wherein the cabin constitutes the carrier. A separate carrier may thus be dispensed with.

In accordance with one embodiment, the rotary-wing aircraft includes a flight attitude control system that is configured to drive the actuators of the drive unit. The flight attitude control system can thus serve to adjust an inclination of the drive unit relative to the carrier in order to control the rotary-wing aircraft. In other words, a tilting movement of the entire drive unit is achieved.

Further advantages and features will be apparent from the description below and from the accompanying drawings, to which reference is made and in which:

FIG. 1 shows a rotary-wing aircraft/helicopter 10 having a drive unit 12.

Figure 1:
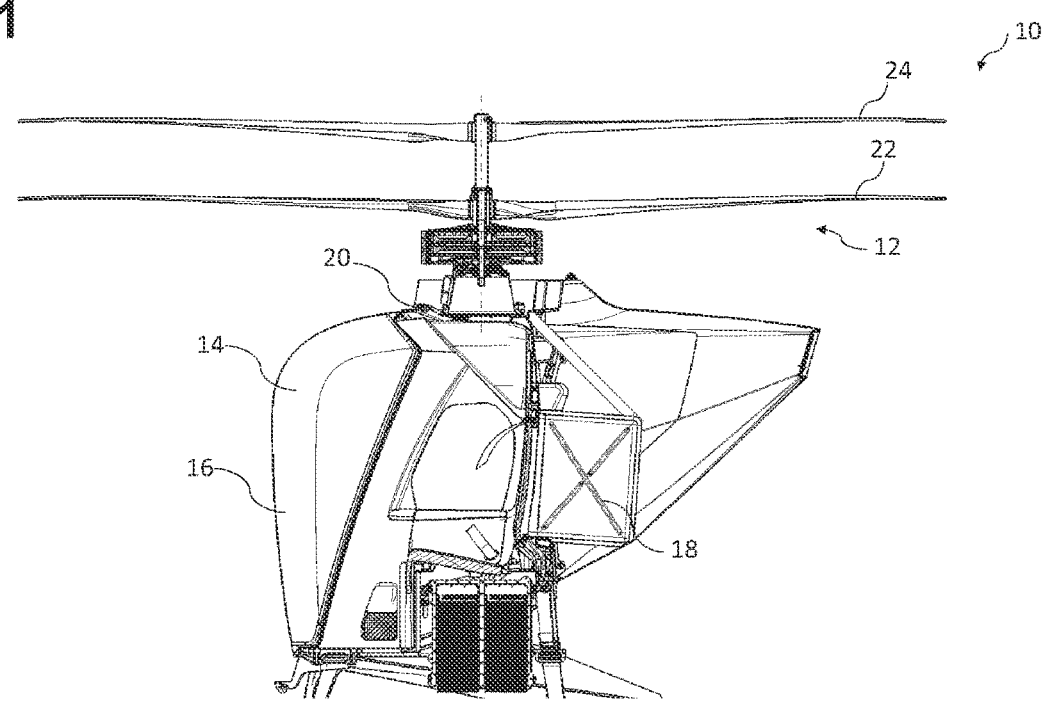
FIG. 1 shows a rotary-wing aircraft according to the invention with a drive unit according to the invention.

The rotary-wing aircraft 10 has a cabin 14 in which a passenger compartment 16 and a payload compartment 18 are formed. Alternatively, the rotary-wing aircraft 10 may be designed exclusively for the transport of goods, so that the passenger compartment 16 may be dispensed with or is used as a second payload compartment.

The maximum take-off weight of the rotary-wing aircraft 10 is, for example, between 150 kg and 600 kg.

The rotary-wing aircraft 10 comprises a carrier 20 for the drive unit 12, the carrier being attached to the cabin 14. The drive unit 12 is arranged above the cabin 14 here.

Alternatively, the carrier 20 may be formed by the cabin 14.

Figure 2:
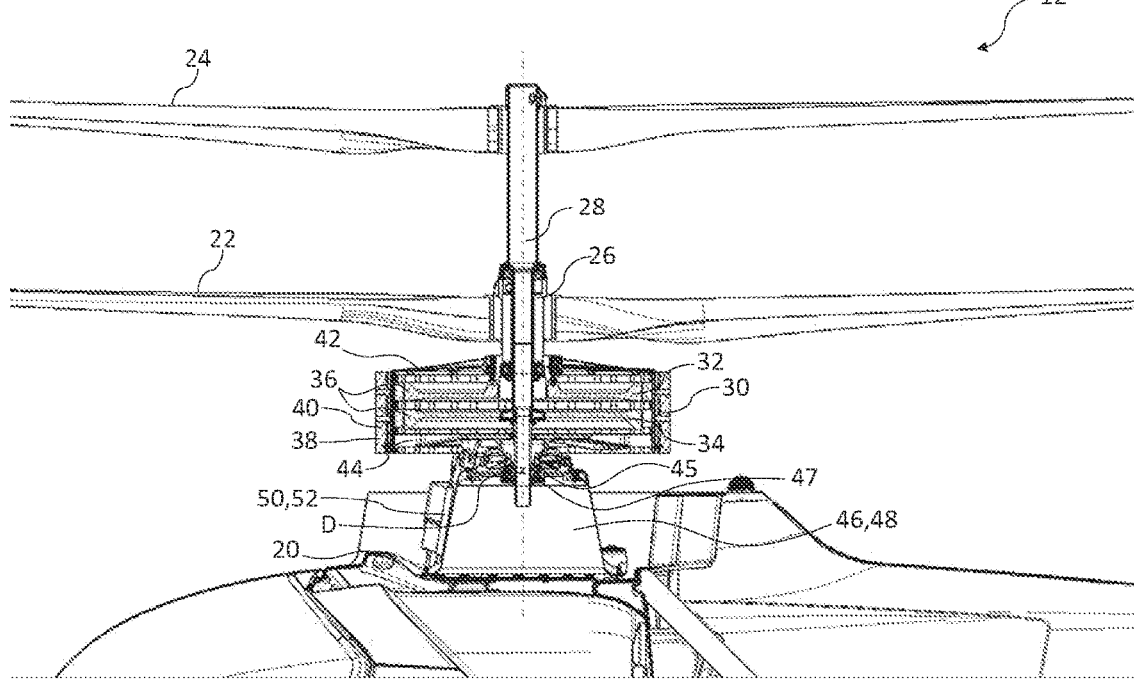
FIG. 2 shows a sectional representation of the rotary-wing aircraft from FIG. 1 in the area of the drive unit.

The drive unit 12, which is also illustrated in FIG. 2, comprises a first propeller 22 and a second propeller 24.

The two propellers 22, 24 are arranged to be coaxial with each other and axially spaced apart from each other. In particular, the propellers 22, 24 form a double propeller.

The two propellers 22, 24 rotate in opposite directions to each other. They have a fixed angle of attack, since the propeller blades are rigidly connected to the hub thereof. Exactly two propeller blades are provided here.

The ratio of the diameter of the propellers 22, 24 to the axial distance between the propellers 22, 24 is, for example, between 4:1 and 12:1. In the case of different diameters of the propellers, this ratio refers to the smaller diameter.

Furthermore, the drive unit 12 comprises a first drive shaft 26 and a second drive shaft 28 arranged coaxially with the first drive shaft 26. The drive shaft 26 is associated with the lower propeller 22, and the drive shaft 28 is associated with the upper propeller 24.

The drive shaft 26 is formed as a hollow shaft, and the drive shaft 28 is guided in the hollow shaft.

An electric drive module 30 is provided for driving the drive shafts 26, 28. The drive module 30 comprises two electric motors 32, 34, which are in the form of internal rotor motors. The rotors 36 of the electric motors 32, 34 are each coupled to a respective one of the drive shafts 26, 28.

The two electric motors 32, 34 are accommodated in a common housing 38, the electric motors 32, 34 being arranged coaxially with each other in the housing 38.

The housing 38 comprises a heat sink 40 and upper and lower housing covers 42, 44. The heat sink 40, which is provided with cooling fins on the outside, allows the heat produced in the electric motors 32, 34 to be dissipated particularly quickly.

Formed in the lower housing cover 44 is an extension 45, in which a bearing 47 is provided for the drive shaft 26.

The rotor 36 of the upper electric motor 32 is firmly connected to the drive shaft 26, which is formed as a hollow shaft and drives the lower propeller 22, and the rotor of the lower electric motor 34 is firmly connected to the drive shaft 28 of the upper propeller 24 and drives the latter by means of the drive shaft 28 guided through the hollow shaft.

The drive unit 12 further comprises a bearing unit 46, by means of which the drive unit 12 is connected to the cabin 14 so as to be pivotable relative to a pivot bearing point D.

Figure 3:
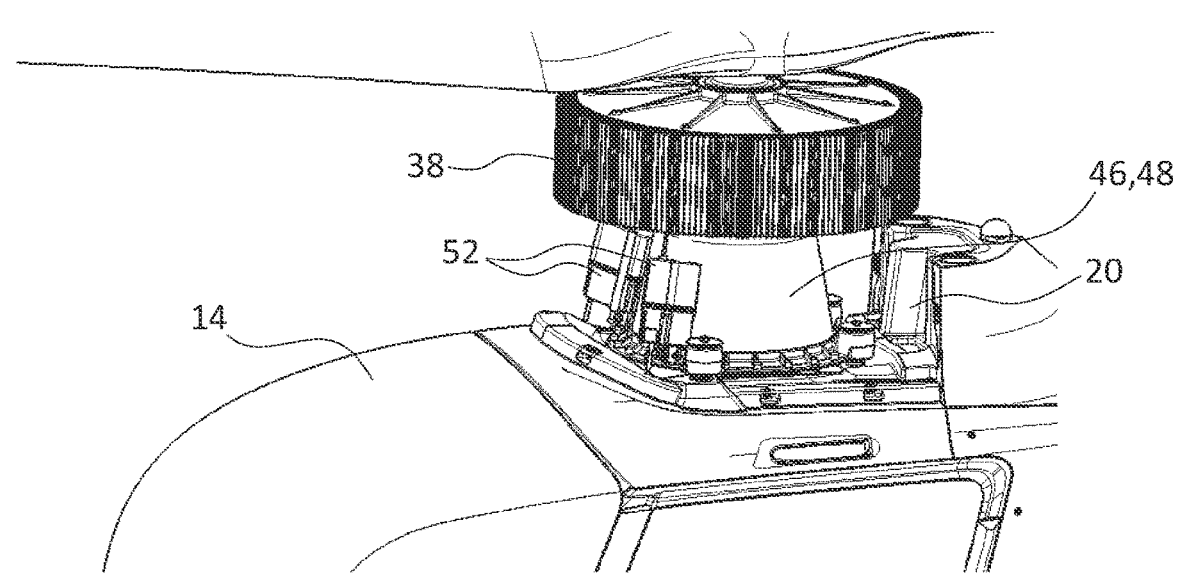
FIG. 3 shows a detail view of the rotary-wing aircraft in the area of a bearing unit of the drive unit.
Figure 4:
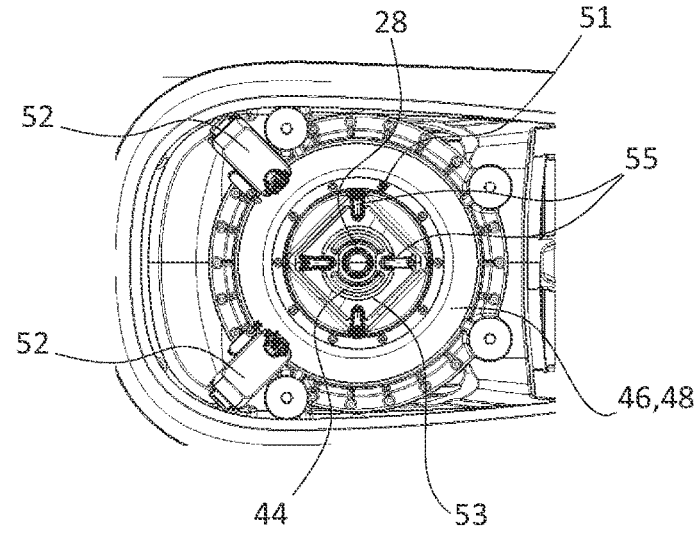
FIG. 4 shows a cross-section taken through the bearing unit.

The bearing unit 46 can be seen particularly clearly in FIGS. 3 and 4.

The bearing unit 46 comprises a cone-shaped connecting element 48, which is bolted to the carrier 20 of the rotary-wing aircraft 10. In particular, the connecting element 48 is bolted to the carrier 20 through a total of four connecting points.

In addition, an adjusting device 50 is provided to allow the alignment of the drive shafts 26, 28 to be adjusted relative to the bearing unit 46 or to the carrier 20.

The adjusting device 50 acts between the bearing unit 46 and a unit formed by the drive module 30 and the drive shafts 26, 28.

In the exemplary embodiment, one end of the adjusting device 50 engages the drive module 30.

The adjusting device 50 comprises two length-adjustable actuators 52, which are more particularly arranged at an angle to one another.

In particular, the actuators 52 are attached by one end to the housing 38, more specifically to the underside of the housing 38.

Figure 5:
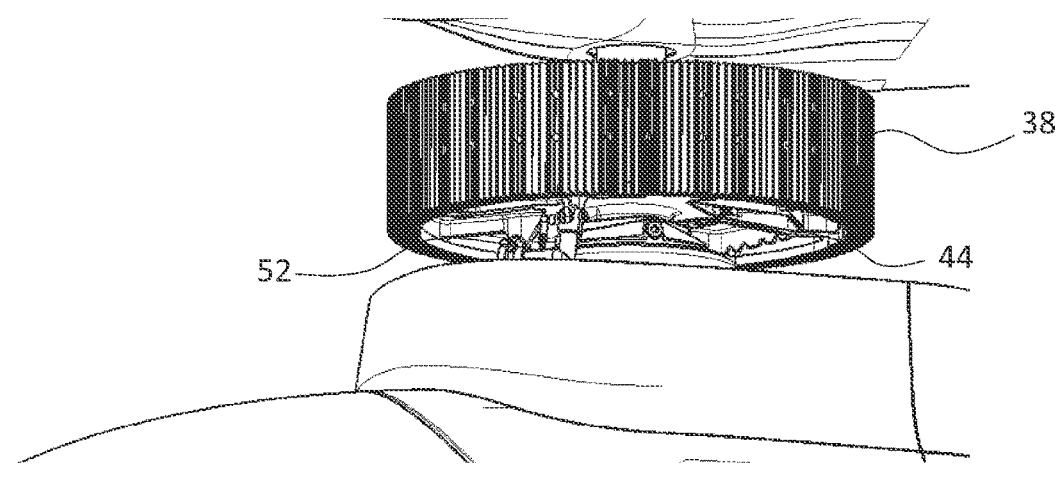
FIG. 5 shows a detail view in the area of an adjusting device of the drive unit.

As can be seen in FIG. 5, the actuators 52 are attached in an articulated manner to the housing 38, in particular to the lower housing cover 44.

The actuators 52 are fastened by their respective other end to the connecting element 48 of the bearing unit 46.

Consequently, a change in the length of the actuators 52 causes the housing 38 to be pivoted, as a result of which the drive shafts 26, 28, which are guided in the housing 38, are also pivoted.

Owing to a certain minimum distance between the connecting points of the actuators 52 in the radial direction in relation to the center axis of the drive shafts, the forces required to pivot the unit formed by the drive module 30 and the drive shafts 26, 28 can be kept low.

To allow the drive shafts 26, 28 to pivot, the unit formed by the drive module and the drive shafts 26, 28 is connected to the bearing unit 46 by means of a universal joint 51. The universal joint is used to transmit the lifting force to the carrier 20 in flight.

The universal joint 51 includes a cross piece 53, which is pivotably mounted on the bearing unit 46 on the outside by means of two studs 55 and is pivotably mounted on the lower housing cover 44 on the inside by means of two studs 55.

In this context, the universal joint 51 is located above the bearing 47 for the drive shaft 28. In other words, the bearing 47 for the inner one of the two drive shafts 26, 28 is arranged on the side of the universal joint 51 facing away from the propellers 22, 24. This can be seen particularly clearly in the sectional representation in FIG. 2 as well as in FIG. 4.

Figure 6:
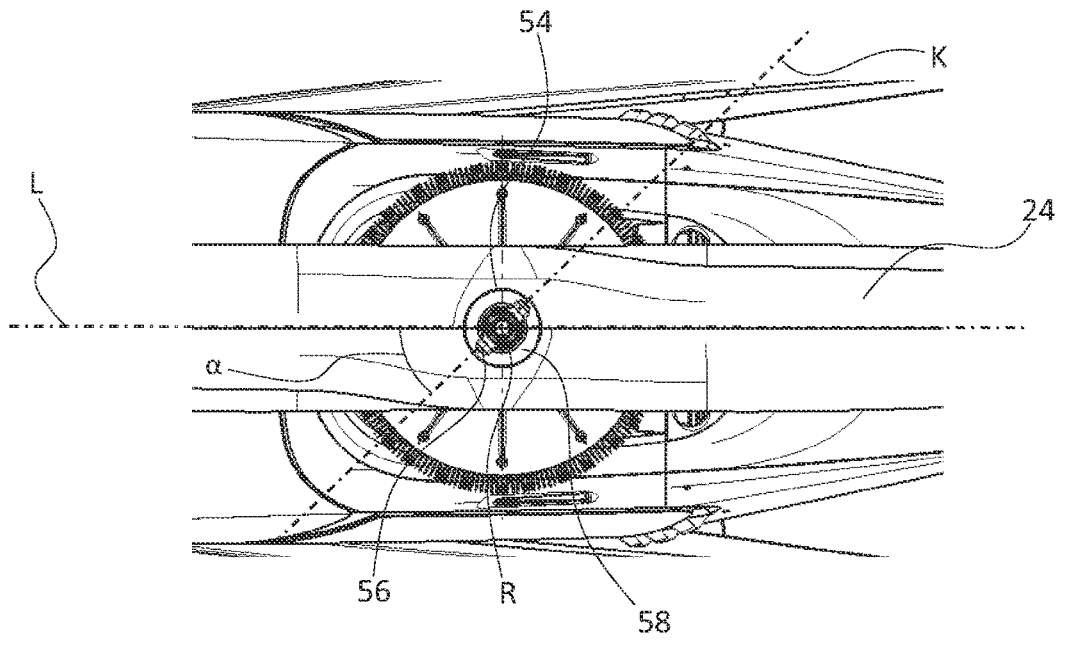
FIG. 6 shows a top view of a propeller.
Figure 7:
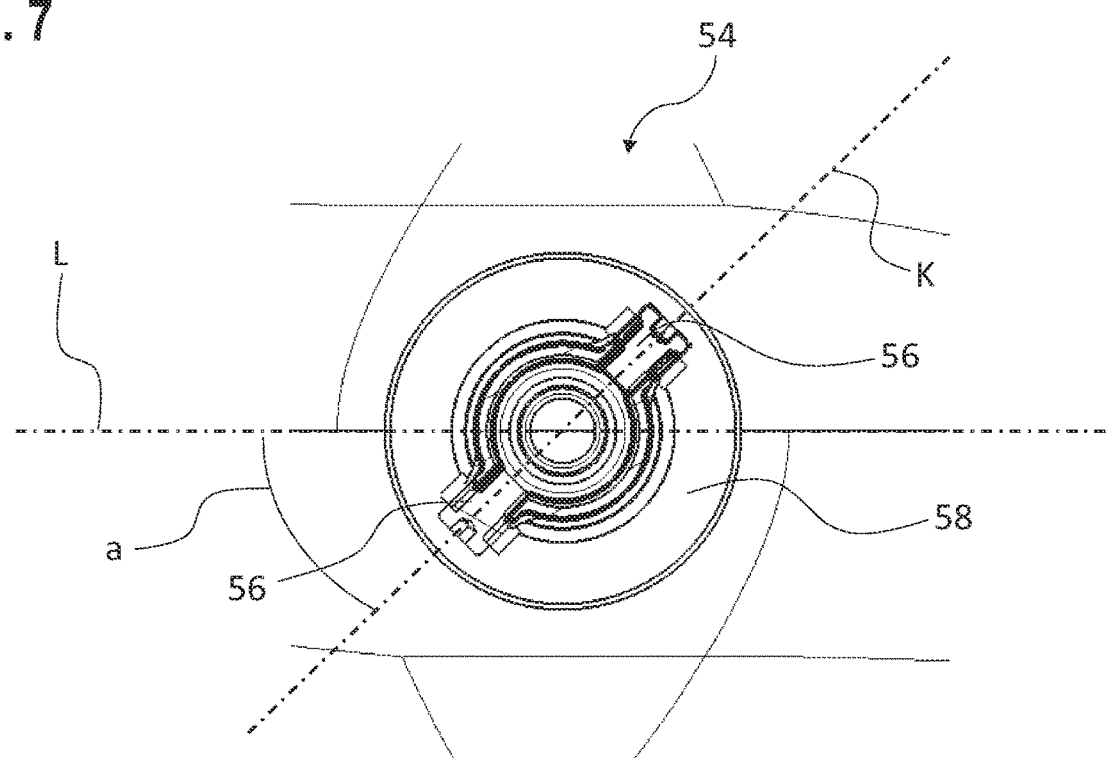
FIG. 7 shows a detail view of a propeller suspension.

FIG. 6 shows a top view of the rotary-wing aircraft 10, in particular of the upper propeller 24 in the area of a support 54 of the propeller 24 at the drive shaft 28. FIG. 7 shows a cross-section taken through the support 54.

The propeller 24 is mounted so as to be tiltable about a tilt axis K relative to the axis of rotation R of the drive shaft 28.

Two pins 56 extend along the tilt axis K and connect a hub 58 of the propeller 24 to the drive shaft 28 in an articulated manner.

The lower propeller 22 is mounted in the same way.

The tilt axis K of each propeller 22, 24 extends in a plane perpendicular to the axis of rotation R of the drive shafts 26, 28 and is oriented at an angle α different from 90° in relation to the longitudinal axis L of the propeller 22, 24. Preferably, the tilt axis K extends at an angle α of +30° to +50° or −30° to −50° relative to the longitudinal axis L of the propeller 22, 24.

Figure 8:
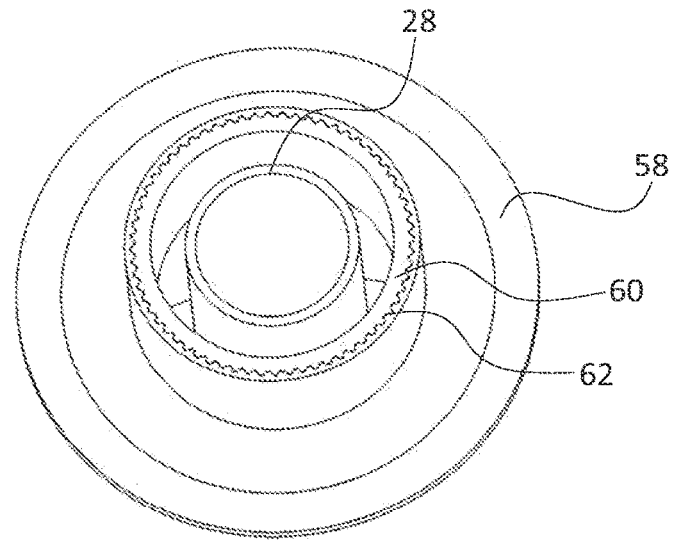
FIG. 8 shows a further detail view of a propeller suspension.

FIG. 8 shows a cross-section taken through the support 54.

It is apparent from FIG. 8 that an intermediate piece 60 is provided which is arranged coaxially with the hub 58 of the propeller 24. The pin 56 is mounted on the intermediate piece 60.

The intermediate piece 60 is detachably connected to the hub 58, in particular by means of a toothing 62. In this way, the hub 58 can be connected to the intermediate piece 60 in various angular positions.

Figure 9:
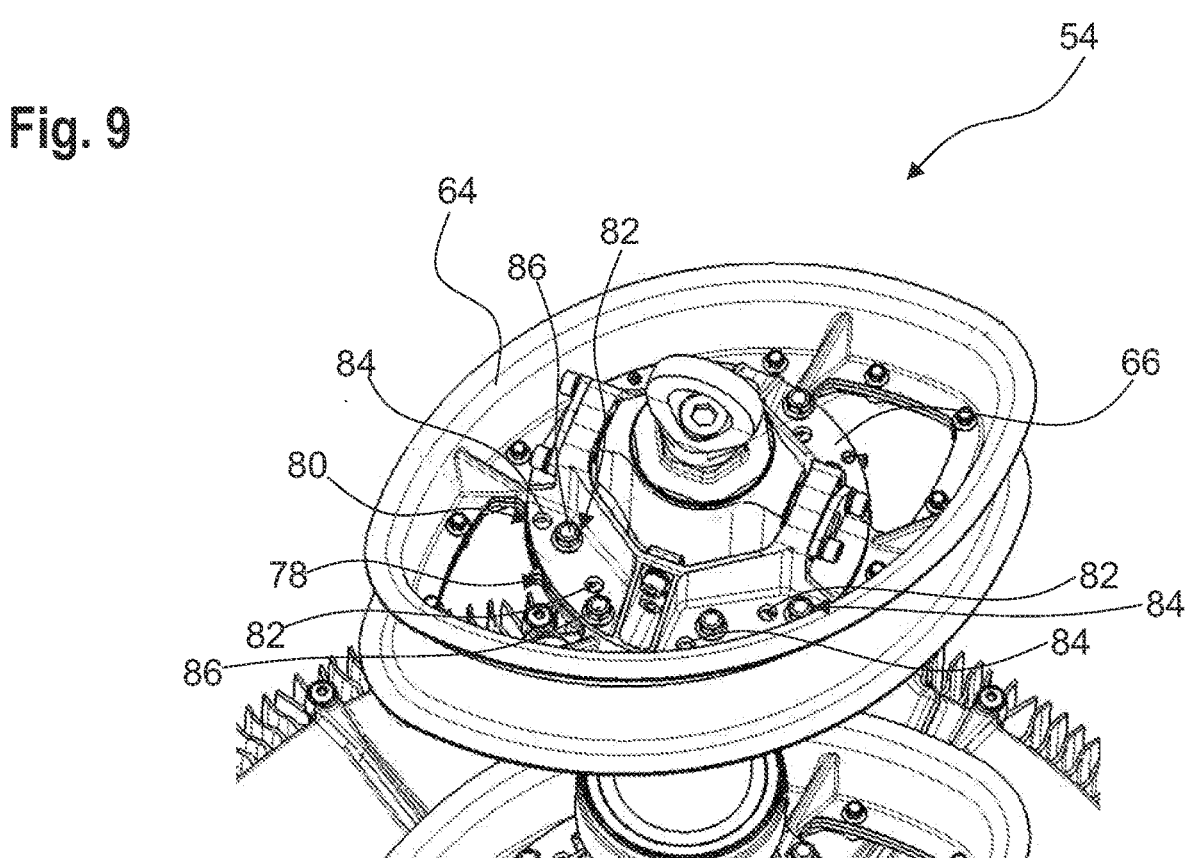
FIG. 9 shows a detail view of an alternative propeller suspension.

FIGS. 8 and 9 illustrate an alternative possibility for realizing an angular offset of the propellers 22, 24 relative to the tilt axis K.

Figure 10:
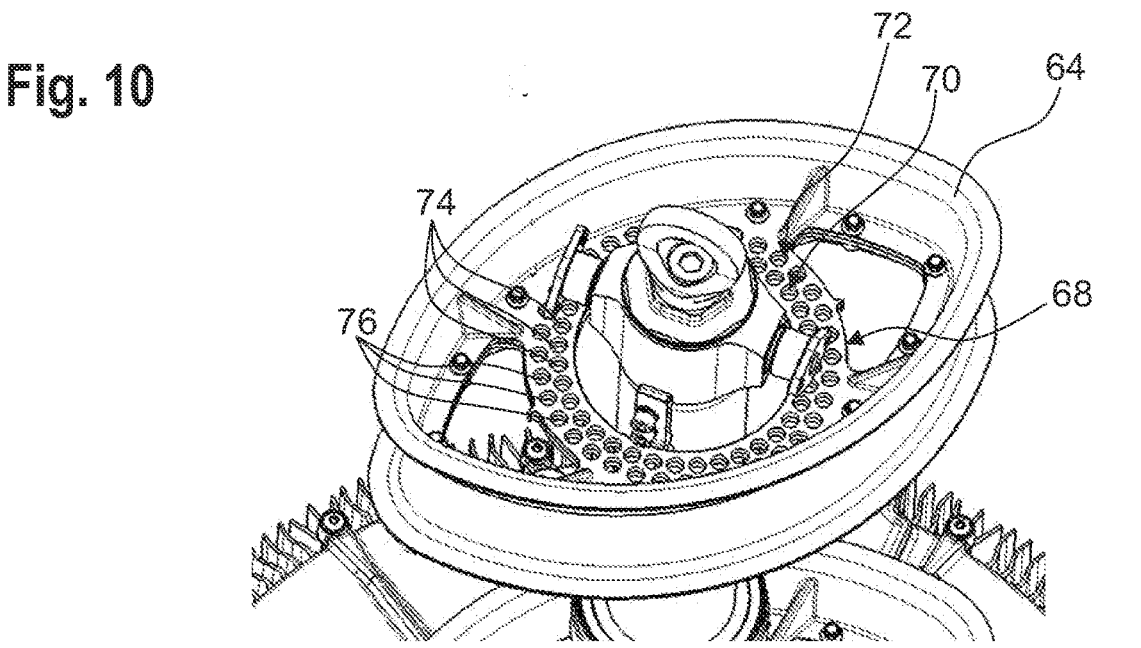
FIG. 10 shows the propeller suspension from FIG. 9.

In this case, the support 54 is realized by a component 64, which is connected to the propeller 24, and an intermediate piece 66. In FIG. 10, the intermediate piece 66 is hidden for better illustration.

The component 64 has a connecting surface 68 provided thereon (see FIG. 10), in which two hole circles 70, 72 are formed, so that the connecting surface 68 has a multitude of holes 74, 76.

The hole circles 70, 72 have different diameters.

The holes 74 of the first hole circle 70 are arranged so as to be angularly offset from the holes 76 of the second hole circle 72. For example, the holes 74, 76 of one hole circle 70,

72 have an offset of 6° from each other and the holes 74 of the first hole circle 70 are also offset by 3° from the holes 76 of the second hole circle 72. In the exemplary embodiment, each hole circle 70, 72 therefore has 60 holes 74, 76.

The pin 56, which is concealed in FIGS. 9 and 10, is mounted at the intermediate piece 66.

The intermediate piece 66 has a contact surface 78 which corresponds to the connecting surface 68 and which is concealed in FIG. 9 because the contact surface 78 rests against the connecting surface 68.

A hole pattern 80 is provided in the contact surface 78.

The holes 74, 76 in the connecting surface 68 and the holes 82, 84 of the hole pattern 80 serve as bolt holes to attach the propeller 24 to the intermediate piece 66. For this purpose, the hole pattern 80 of the contact surface 78 may be oriented such that at least some holes 82 are in alignment with holes 74, 76 of the connecting surface 68 so that a bolt 86 can be fitted through the connecting surface 68 and the contact surface 78.

The hole pattern 80 is formed such that the propeller 24 can be connected to the intermediate piece 66 in various angular positions.

In FIG. 9, it can be seen that the hole pattern 80 has a first group of holes 82 in alignment with the holes 74 of the first hole circle 70 of the connecting surface 68 and a second group of holes 84 in alignment with the holes 76 of the second hole circle 72 of the connecting surface 68. The holes of one group thus each have the same radial distance from an axis of rotation of the propeller 24 or, put differently, they are located on a circle whose diameter corresponds to the diameter of one of the hole circles 70, 72. In other words, the holes 82 of the first group are associated with the first hole circle 70 and the holes 84 of the second group are associated with the second hole circle 72.

As can be further seen in FIG. 9, the holes 82, 84 of the hole pattern 80 are arranged such that not all of the holes 82, 84 are aligned with the holes 74, 76 at the same time.

In this way, an improved angular adjustment can be made possible in cooperation with the mutually offset holes 74, 76 of the hole circles 70, 72, in which an angular offset between the possible angular positions is as small as possible. In the exemplary embodiment, the angular offset between the feasible positions is 3° in each case.

More specifically, the hole pattern 80 has different pairs of holes, each having one hole 82 of the first group and one hole 84 of the second group, the pairs of holes being alternately aligned with the holes 74, 76 of the hole circles 70, 72.

The mounting of the propeller 22 may be implemented in the same way.

In an alternative embodiment, which is not shown for simplicity, the component 64 may be integrally formed with the propeller 22, 24.

The invention claimed is:

1. A drive unit for a rotary-wing aircraft, comprising:
   a first propeller and a second propeller, which rotates in the opposite direction to, and is axially spaced apart from, the first propeller,
   a first drive shaft and a second drive shaft, arranged coaxially with the first drive shaft, for the first and second propellers,
   wherein the first and second propellers are each rigid and are mounted so as to be tiltable relative to an axis of rotation of their drive shafts, wherein a tilt axis of each propeller extends in a plane perpendicular to the axis of rotation of the drive shafts and is oriented at an angle different from 90 degrees relative to a longitudinal axis of the propellers, an electric drive module having at least two rotors which are coupled to a respective one of the drive shafts, wherein the ratio of a diameter of the propellers to an axial distance between the propellers is between 4:1 and 12:1;

wherein the drive unit comprises a bearing unit connecting the drive unit to a cabin of a rotary-wing aircraft so as to be pivotable relative to a pivot bearing point, wherein the unit formed of the electric drive module and the drive shafts is connected to the bearing unit using a universal joint, and wherein a bearing for an inner one of the drive shafts is arranged on a side of the universal joint facing away from the propellers.

2. The drive unit according to claim 1, wherein the tilt axis extends at an angle of +30° to +50° or −30° to −50° relative to the longitudinal axis of the propellers.

3. The drive unit according to claim 1, wherein at least one pin extends along the tilt axis and connects a hub of the propellers to the drive shaft in an articulated manner.

4. The drive unit according to claim 3, wherein an intermediate piece is arranged coaxially with the hub of the propellers and is detachably connected to the hub and on which the pin is mounted and which is adapted to be connected to the hub in various angular positions.

5. The drive unit according to claim 3, wherein the propellers have a connecting surface in which a multitude of holes is provided, and an intermediate piece on which the pin is mounted has a contact surface corresponding to the connecting surface, wherein the contact surface has a hole pattern provided therein which is configured such that the propellers can be connected to the intermediate piece in various angular positions.

6. The drive unit according to claim 1, wherein the electric drive module includes two electric motors which are accommodated coaxially with each other in a shared housing.

7. The drive unit according to claim 1, wherein an adjusting device acts between the bearing unit and a unit formed of the electric drive module and the drive shafts in order to be able to adjust an orientation of the drive shafts relative to the bearing unit.

8. The drive unit according to claim 7, wherein one end of the adjusting device engages the electric drive module.

9. A rotary-wing aircraft comprising a drive unit according to claim 1, wherein the rotary-wing aircraft includes a cabin which constitutes a passenger compartment and/or a payload compartment.

10. The rotary-wing aircraft according to claim 9, wherein the rotary-wing aircraft comprises a carrier for the drive unit, wherein an adjusting device is fixed to a bearing unit and is configured such that it can pivot a unit formed of the electric drive module and the drive shafts in relation to the carrier.

11. The rotary-wing aircraft according to claim 10, wherein the drive unit is arranged above the cabin, wherein the cabin constitutes the carrier.

12. A rotary-wing aircraft comprising a drive unit according to claim 2, the rotary-wing aircraft includes a cabin which constitutes a passenger compartment and/or a payload compartment.

13. The rotary-wing aircraft according to claim 12, wherein the rotary-wing aircraft comprises a carrier for the drive unit, wherein an adjusting device is fixed to a bearing unit and is configured such that it can pivot a unit formed of the electric drive module and the drive shafts in relation to the carrier.

14. A drive unit for a rotary-wing aircraft, comprising:

a first propeller and a second propeller, which rotates in the opposite direction to, and is axially spaced apart from, the first propeller, a first drive shaft and a second drive shaft, arranged coaxially with the first drive shaft, for the first and second propellers, wherein the first and second propellers are each rigid and are mounted so as to be tiltable relative to an axis of rotation of their drive shafts, wherein a tilt axis of each propeller extends in a plane perpendicular to the axis of rotation of the drive shafts and is oriented at an angle different from 90 degrees relative to a longitudinal axis of the propellers, an electric drive module having at least two rotors which are coupled to a respective one of the drive shafts, wherein the ratio of a diameter of the propellers to an axial distance between the propellers is between 4:1 and 12:1, wherein at least one pin extends along the tilt axis and connects a hub of the propellers to the drive shaft in an articulated manner, and wherein the propellers have a connecting surface in which a multitude of holes is provided, and an intermediate piece on which the pin is mounted has a contact surface corresponding to the connecting surface, wherein the contact surface has a hole pattern provided therein which is configured such that the propellers can be connected to the intermediate piece in various angular positions.

* * * * *